A. P. KLETZSCH.
VENTILATION SYSTEM FOR SOIL AND WASTE PIPES.
APPLICATION FILED SEPT. 22, 1910.
992,882. Patented May 23, 1911.
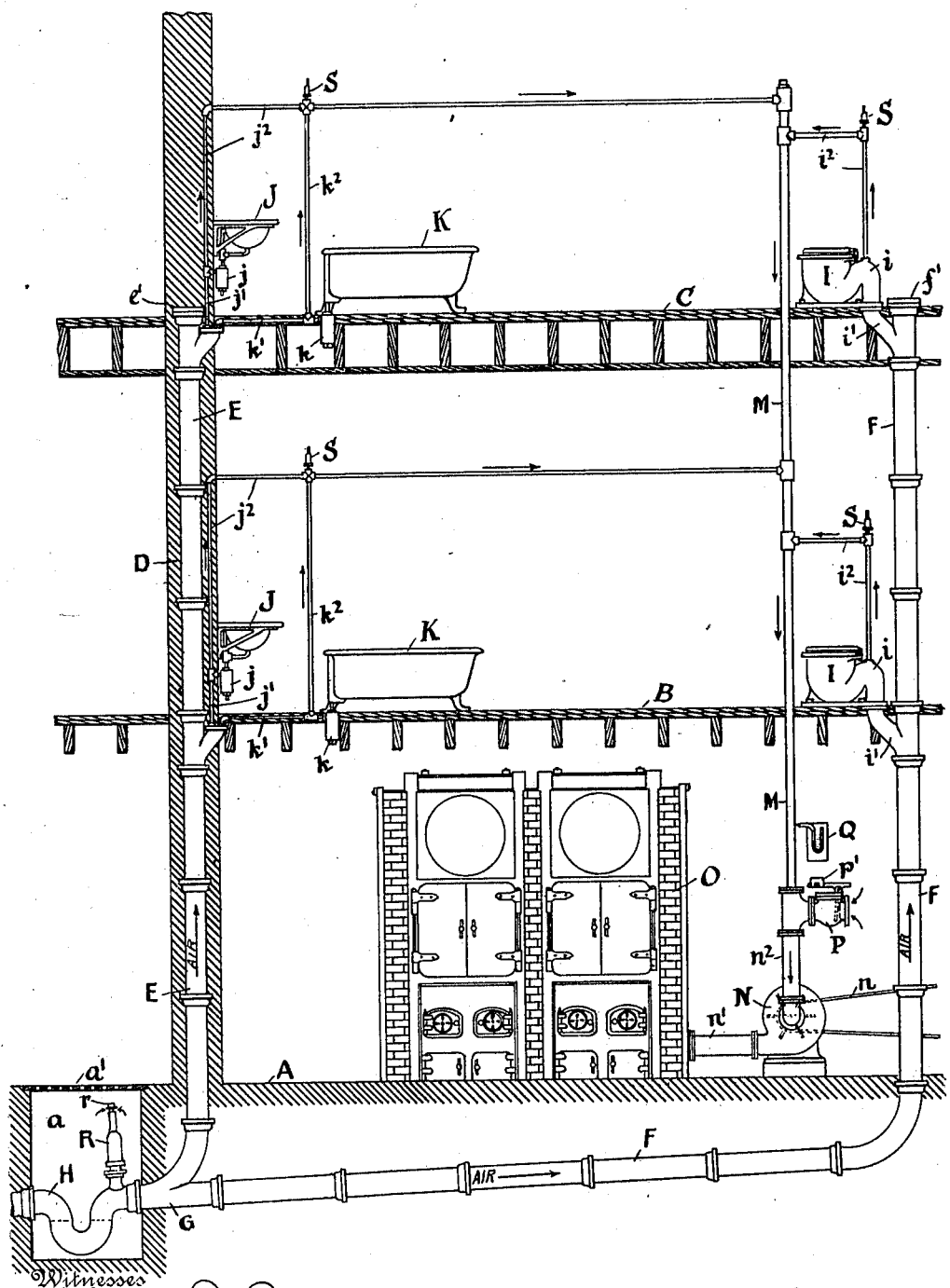

UNITED STATES PATENT OFFICE.

ALVIN P. KLETZSCH, OF MILWAUKEE, WISCONSIN.

VENTILATION SYSTEM FOR SOIL AND WASTE PIPES.

992,882.  Specification of Letters Patent.  Patented May 23, 1911.

Application filed September 22, 1910. Serial No. 583,160.

*To all whom it may concern:*

Be it known that I, ALVIN P. KLETZSCH, of Milwaukee, Wisconsin, have invented a Ventilation System for Soil and Waste Pipes, of which the following is a specification.

This invention relates to house-plumbing systems, and my object is to provide a means not only much cheaper to install but also much more efficient from a sanitary standpoint than the system in common use.

According to the system in general use, vertical soil-pipes are installed around which on the various floors of the building the water-using devices are grouped, and to which they are connected through individual traps. A main sewer-trap at the base of the soil-pipe seals it against the entrance of gases from the sewer; but as it is also necessary to provide a means of removing the gases arising from the flow in the pipe itself, this is effected, or supposed to be effected, by carrying the pipe up through and above the roof and leaving the upper end open. This indeed provides means of egress for the accumulating gases, but does not provide any means for removing such gases, as the soil-pipe forms substantially a well closed at the bottom with no means for circulating air therethrough; consequently the pipe is constantly full of the gases arising from the decomposition of waste organic matter and ready to discharge said gases into the apartments of the house should there be any leak in the pipe. Furthermore the connection of the house-fixtures to the soil-pipe through individual siphon-traps makes necessary an air-relief for said traps to prevent their being "siphoned off" by a column of water either passing through the individual trap or through the soil-pipe from some point above the fixture; and such relief is, according to the current-system, provided by means of a vent-pipe which is installed alongside of the soil-pipe and connected by branches to each individual trap on the inner or soil-pipe side. To provide ventilation for this pipe, as well as to prevent the discharge of gases in the interior of the house, it is necessary to carry this pipe also to a point above the roof, where its upper end is left open.

It will be seen on consideration that this system involves not only a quantity of piping which is entirely out of proportion to the object to be attained, but also fails in part to accomplish said object, since it provides no circulation means within the pipes, and while theoretically air from the outside may descend one pipe and ascend the other and thus produce a circulation, I have found that in fact this does not take place to any sensible extent.

It is the object of this invention to provide a mechanical system of ventilation for soil-pipes and traps which shall not only infallibly produce the desired circulation and remove the gases of decomposition from such pipes as fast as they accumulate, but also make unnecessary the provision of special vent-pipes and the continuation of soil-pipes through the roof, which in large buildings such as hotels, apartment houses and office buildings becomes a very serious item of expense and moreover consumes valuable space and thus detracts in so far from the rental value of the building.

The principle of my invention is, in essence, to provide a suction of vacuum-piping system, with means for maintaining therein a very light vacuum (as for example a fraction of an inch of water) and branch connections from said piping system to the soil-pipe side of each individual trap; together with ingress means for air at the base of the soil-pipe provided with an automatic seal against the egress of water. In many cases the aforesaid vacuum system may form merely a secondary feature of a vacuum or air-blast system maintained for other purposes, as for example for dust-removing or ventilating systems, or the maintenance of a boiler-draft in heating- or power-systems.

My invention will best be understood in its details by a consideration of the accompanying drawing illustrative of the same, which shows somewhat diagrammatically a sectional elevation of a house provided with such a system.

For the sake of clearness and avoidance of unnecessary detail, the water-supply pipes for the various fixtures are here omitted, only the waste-pipes and other accessories being shown. The drawing illustrates a building having a basement and two floors, from which, however, it will be readily understood that any number of additional floors would involve merely a repetition of the arrangement shown for the first floor.

The basement floor is designated A and the first and second floors B and C respectively.

D may designate a partition-wall, in which is installed the vertical soil-pipe E. A second soil-pipe F is shown, which may be supposed to be on the other side of the building, or at a distance from the pipe E, both pipes being connected through a branch fitting G to the main-sewer-trap H, which discharges directly into the sewer. A well $a$ covered by a grating $a'$ is provided in the floor A to give access to the trap H and the automatic air-valve attached thereto which is described below.

On the several floors of the building are located fittings, such as closets I, sinks J, and tubs K, connected through traps $i, j$ and $k$ to branch pipes $i'$, $j'$ and $k'$, which discharge into the soil-pipes E and F. The upper ends of said soil-pipes, it will be observed, are not carried beyond the highest fixture, but are closed by plugs $e'$ and $f'$, or otherwise sealed. In place of the usual vent-pipes I provide a system of vacuum-pipes M from which branches $i^2$, $j^2$ and $k^2$ lead to the traps $i, j$ and $k$ and open into the inner sides thereof. A light vacuum as aforesaid is maintained in the piping-system M, as for example by a blower N located in the basement and driven by a belt $n$. In places where a fire is maintained, as is generally the case in large buildings, it is convenient to dispose of the gases sucked from the piping-system M by discharging them directly into such fire; as for example, is represented in the drawing by a boiler, or battery of boilers, into which the fan N discharges by a pipe $n'$. To hold the vacuum in the system M at a predetermined maximum an automatic relief-valve P is preferably provided, such valve admitting air to the system whenever the suction produced by the blower rises unduly, and having means for adjustment such as a sliding-weight $p'$. The system N, P, and $n'$ may in fact constitute a mechanical draft-system for the boilers O, the intake-pipe $n^2$ being enlarged so that a part of the necessary air for the draft is drawn in through the valve P. A vacuum-gage is indicated at Q.

To produce an air-circulation in the waste-pipe system it will be necessary to admit air at one point thereof, preferably the lowest point, and this is accomplished by a self-closing air-valve R, admitting air passing inwardly but closing automatically in the case the air-pressure is from the inside and whenever water rises in the valve. As such valves of various construction are to be purchased on the market, it is not considered necessary to illustrate its internal mechanism. An adjustable plug $r$ may be provided should it be desired to produce a resistance to the inflow of air through the valve or regulate such resistance, but under ordinary circumstances will not be necessary.

It will be seen that the action of the system is to draw a continuous current of air through the valve R, which entering the soil-pipes passes up through them and into the branch-pipes $i'$, $j'$, $k'$ of the various fixtures, and thence out through the branch-pipes $i^2$, $j^2$ and $k^2$ to the vacuum-system M whence they are caused by the fan N to pass through the boiler fire and there disintegrated. However, I do not wish it understood that the fan N is a necessary element, as such fan might be omitted and the piping-system M caused to discharge directly into the draft-circulation system of the fire at any point thereof, either under or over the fire itself, wherever there is sufficient suction to produce the necessary vacuum.

Whenever a discharge of waste-water takes place from any fixture, the trap $i, j$ or $k$, will not be siphoned off, because in this case the air stored in the branch-pipes $i^2$, $j^2$ and $k^2$ of the vacuum system M acts to break the siphoning effect the same as a vent-pipe, the vacuum-pressure in these pipes being too low to maintain the siphon. If found desirable also, automatic relief-valves S may be placed in the branch-pipes $i^2$, $j^2$ and $k^2$, which valves are normally closed but admit air upon a very slight excess of vacuum, and thus provide for any sudden and large increase of vacuum such as might be produced by a large column of water descending the soil-pipe; but I wish it understood that such relief-valves are non-essential to the operation of the system.

It will be clear that my system provides not only for continuous ventilation, but also that the circulation-piping which is substituted for the other piping made unnecessary thereby, being of small dimensions, is comparatively inexpensive and takes up no space worth mentioning. The vacuum pipes as shown can be carried horizontally or in any direction and therefore but one riser is needed to supply an entire building.

I wish it understood that my invention is not limited to the use of all the above described features and constructions, for some may be omitted and others may be varied or modified in various ways, as will readily occur to those skilled in the art.

Having thus described my invention, what I claim as new and desire to secure by Letters Patent is:

1. Ventilation-means for waste-pipe systems comprising, in combination with the waste-pipe and one or more fixtures connected thereto by branch-pipes, means for passing a current of air from the waste-pipe into the branch-pipe or pipes and thence to a place of disposal.

2. Ventilation-means for waste-pipe systems comprising, in combination with the waste-pipe and one or more fixtures connected thereto by branch-pipes, said waste-pipe being closed at the top and having an air-inlet at the bottom, air-pipes connected to said branch-pipes, and means for passing a current of air through said air-inlet upwardly through said waste-pipe into said branch-pipe or pipes and out through the air-pipe or pipes connected therewith.

3. Ventilation-means for waste-pipe systems comprising, in combination with the waste-pipe and one or more fixtures connected thereto by branch-pipes, said waste-pipe being closed at the top and having an air-inlet at the bottom, air-pipes connected to said branch-pipes, and means for producing a vacuum in said air-pipe or pipes whereby a current of air is drawn through said inlet, upwardly through said waste-pipe into said branch-pipe or pipes and out through said air-pipe or pipes.

4. Ventilation-means for waste-pipes comprising, in combination with a waste-pipe, fixtures connected thereto by branch-pipes, air-pipes connected with said branch-pipes and means for producing a vacuum in said air-pipe or pipes whereby a current of air is drawn through said waste-pipe into said branch-pipe or pipes and out through said air-pipe or pipes.

5. In house-plumbing systems, in combination with a waste-pipe, one or more fixtures connected thereto by branch-pipes, a vacuum-piping system with means for maintaining a vacuum therein, and branch-pipes from said piping-system connected to said first-named branch-pipes.

6. In house-plumbing systems, in combination with a waste-pipe, one or more fixtures connected thereto by branch-pipes, a vacuum-piping system with means for maintaining a vacuum therein, branch-pipes from said piping system connected to said first-named branch-pipes and inwardly-opening automatic relief-valves in said last-named branch-pipes.

7. In house-plumbing systems, in combination with a waste-pipe closed at the top, one or more fixtures connected thereto by branch-pipes, a vacuum-piping system with means for maintaining a vacuum therein, branch-pipes from said piping-system connected to said first-named branch-pipes, and an air-intake at the lower end of said waste-pipe.

8. In house-plumbing systems, in combination with a waste-pipe closed at the top, one or more fixtures connected thereto by branch-pipes, a vacuum-piping system with means for maintaining a vacuum therein, branch-pipes from said piping-system connected to said first-named branch-pipes, an opening in said waste-pipe at the lower end, and an inwardly-opening air-valve adapted to close on excess of pressure from within covering said opening.

9. In house-plumbing systems, in combination with a waste-pipe closed at the top, one or more fixtures connected thereto by branch-pipes, a vacuum-piping system with means for maintaining a vacuum therein, branch-pipes from said piping-system connected to said first-named branch-pipes, an opening in said waste-pipe at the lower end, an inwardly-opening air-valve adapted to close on excess of pressure from within covering said opening, and automatic inwardly-opening air-relief valves connected with the branch-pipes of said fixtures.

10. The combination with a waste-pipe, water-using fixtures, and branch-pipes connecting said fixtures with said waste-pipe, of an air-pipe system connected with the individual branch-pipes and a furnace into which said air-pipe system discharges.

11. The combination with a waste-pipe, water-using fixtures, and branch-pipes connecting said fixtures with said waste-pipe, of an air-pipe system connected with the individual branch-pipes, a furnace, and a blower adapted to draw the air and gases from said system and discharge them into said furnace.

12. The combination with a waste-pipe, water-using fixtures, and branch-pipes connecting said fixtures with said waste-pipe, of an air-pipe system connected with the individual branch-pipes, a furnace into which said air-pipe system discharges, side-inlet for air into said system, and a self-opening valve governing said inlet and adapted to open at a predetermined vacuum.

13. The combination with a waste-pipe, water-using fixtures, and branch-pipes connecting said fixtures with said waste-pipes, of an air-pipe system connected with the individual branch-pipes, a furnace, a blower adapted to draw the air and gases from said system and discharge them into said furnace, a side-opening to the intake of said blower, and an automatic back-pressure valve governing said inlet.

14. The combination of a waste-pipe system comprising one or more rising waste-pipes discharging through a water-seal at the bottom, a plurality of fixtures connected to said waste-pipe system by water-sealed branch-pipes, an air-piping system connected to said branch-pipes on the inner side of the water-seals thereof, and a furnace into which air and gases from said air-piping system are drawn and delivered.

15. The combination of a waste-pipe system comprising one or more rising waste-pipes closed at their upper ends and discharging through a water-seal at the bottom, of an air-inlet valve opening into the lower end of the system and adapted to close by pressure from within, a plurality of fixtures connected to said waste-pipe system by water-sealed branch-pipes, an air-piping system connected to said branch-pipes on the inner sides of the water-seals thereof, and a furnace into which air and gases from said air-piping system are drawn and delivered.

16. The combination of a waste-pipe system comprising one or more rising waste-pipes closed at their upper ends and discharging through a water-seal at the bottom, of an air-inlet valve opening into the lower end of the system and adapted to close by pressure from within, a plurality of fixtures connected to said waste-pipe system by water-sealed branch-pipes, an air-piping system connected to said branch-pipes on the inner sides of the water-seals thereof, a furnace, and a draft producing device adapted to draw air and gases from said air-piping system and deliver them into said furnace.

In witness whereof I have hereunto set my hand in the presence of two witnesses.

ALVIN P. KLETZSCH.

Witnesses:
HERMAN O. KLETZSCH,
ALBERT PAUL.

Copies of this patent may be obtained for five cents each, by addressing the "Commissioner of Patents, Washington, D. C."